US012759204B2

(12) United States Patent
Lin et al.

(10) Patent No.: US 12,759,204 B2
(45) Date of Patent: Oct. 13, 2026

(54) MANUFACTURING METHOD OF HOUSING STRUCTURE OF ELECTRONIC DEVICE

(71) Applicants: Acer Incorporated, New Taipei City (TW); NanPao New Materials Technology (Huaian) Co., Ltd., Jiangsu (CN)

(72) Inventors: Pin-Chueh Lin, New Taipei City (TW); Wen-Chieh Tai, New Taipei City (TW); Cheng-Nan Ling, New Taipei (TW); Chang-Huang Huang, Jiangsu (CN)

(73) Assignees: Acer Incorporated, New Taipei City (TW); NanPao New Materials Technology (Huaian) Co., Ltd., Jiangsu (CN)

( * ) Notice: Subject to any disclaimer, the term of this patent is extended or adjusted under 35 U.S.C. 154(b) by 569 days.

(21) Appl. No.: 18/317,937

(22) Filed: May 16, 2023

(65) Prior Publication Data

US 2024/0109230 A1 Apr. 4, 2024

(30) Foreign Application Priority Data

Oct. 4, 2022 (TW) ................................ 111137722

(51) Int. Cl.
*B29C 45/16* (2006.01)
*B29C 45/00* (2006.01)
*B29L 31/34* (2006.01)

(52) U.S. Cl.
CPC ...... *B29C 45/1679* (2013.01); *B29C 45/0055* (2013.01); *B29K 2995/0026* (2013.01); *B29L 2031/3481* (2013.01)

(58) Field of Classification Search
CPC .............. B29C 45/1679; B29C 45/162; B29C 45/1634; B29C 2045/1673
See application file for complete search history.

(56) References Cited

U.S. PATENT DOCUMENTS

| | | | | |
|---|---|---|---|---|
| 3,773,886 | A * | 11/1973 | Starr et al. | B44F 9/04 264/254 |
| 5,820,799 | A * | 10/1998 | Barnett | B44C 3/04 264/73 |
| 2003/0038402 | A1 * | 2/2003 | Visconti | B29C 31/044 264/324 |

FOREIGN PATENT DOCUMENTS

| | | | |
|---|---|---|---|
| GB | 2237238 | * | 5/1991 |
| JP | H0818345 | * | 2/1996 |
| KR | 1019970003396 | * | 10/1998 |
| TW | 201836456 | | 10/2018 |
| TW | 202045642 | | 12/2020 |

* cited by examiner

*Primary Examiner* — Edmund H Lee
(74) *Attorney, Agent, or Firm* — JCIPRNET

(57) ABSTRACT

A manufacturing method of housing structure of electronic device is provided. The manufacturing method includes stacking a first structural layer, a painting layer, and a second structural layer, wherein the painting layer is located between the first and the second structural layers. The layer stacked after the painting layer washes and squeezes at least a portion of the flowing painting layer to form a random texture pattern.

7 Claims, 8 Drawing Sheets
(3 of 8 Drawing Sheet(s) Filed in Color)

MANUFACTURING METHOD OF HOUSING STRUCTURE OF ELECTRONIC DEVICE

CROSS-REFERENCE TO RELATED APPLICATION

This application claims the priority benefit of Taiwan application serial no. 111137722, filed on Oct. 4, 2022. The entirety of each of the above-mentioned patent applications is hereby incorporated by reference herein and made a part of this specification.

BACKGROUND

Technical Field

The disclosure relates to a manufacturing method of housing structure of electronic device.

Description of Related Art

As the use of portable electronic devices (e.g., laptop, tablet, smartphone, etc.) becomes popular and becomes a permanent item in daily life, the appearance of these portable electronic devices is also changing rapidly. Therefore, many materials and related manufacturing techniques can also be applied to the housing structure of these portable electronic devices to improve their aesthetics.

Take the coating as an example, which is to coat the outer surface of the housing structure with a layer of film for protection and appearance. However, this process is usually a post-manufacturing process for the fabricated portable electronic device, and is mostly used for customized products, so it is difficult to mass-produce.

In addition, taking in-mold decoration (IMD) as an example, it is a technology that integrates plastic processing processes such as printing, hot pressing, and injection. It needs to form a forming film with a pattern first, and then put it into the mold for forming the housing structure, so that the pattern is transferred to the surface of the housing structure.

Although the in-mold decoration technology can be used for mass production, it cannot produce a three-dimensional (depth of field) effect due to the difficulty of making the film, and it is not suitable for surfaces with complex shapes. In addition, it can only be applied to the surface of the product with a relatively flat or small curvature, so as to avoid the case of the film being wrinkled or cracked, which will lead to the failure of the housing structure.

SUMMARY

The application provides a manufacturing method of housing structure of electronic device, which is used to form random texture patterns on the surface during the manufacturing process of the housing structure, and can adapt to various surface contours without limitation.

The manufacturing method of housing structure of electronic device includes stacking a first structural layer, a painting layer, and a second structural layer, wherein during the process of stacking the second structural layer, the second structural layer washes and squeezes at least a portion of the painting layer to form a random texture pattern.

Based on the above, in the manufacturing process of the housing structure, including stacking the first structural layer, painting layer and second structural layer of the three-layer structure, wherein the painting layer is located between the first structural layer and the second structural layer. And the layers stacked after the painting layer are stacked in a state where the painting layer is flowable. Therefore, it will further wash and squeeze the flowing painting layer during the stacking process, so that the painting layer will generate random texture patterns. In this way, the housing structure can be reworked to its appearance pattern in a simple way and with simplified steps. In addition, the reprocessing is completed together with the stacking process of the structural layers, so the manufacturing process of the housing structure does not require additional steps, which can effectively save processing time, processing cost and simplify the processing technology.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE EMBODIMENTS

Figure 1A:
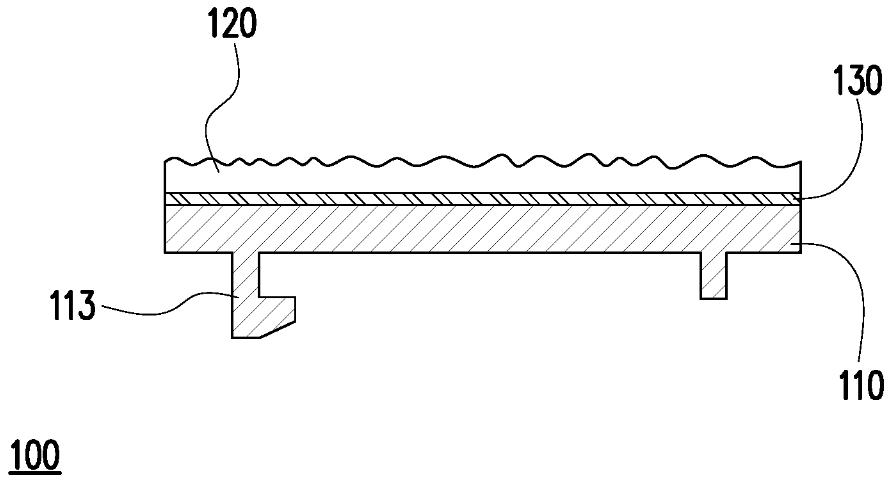
FIG. 1A is a partial schematic diagram of a housing structure according to an embodiment of the present application.
Figure 1B:
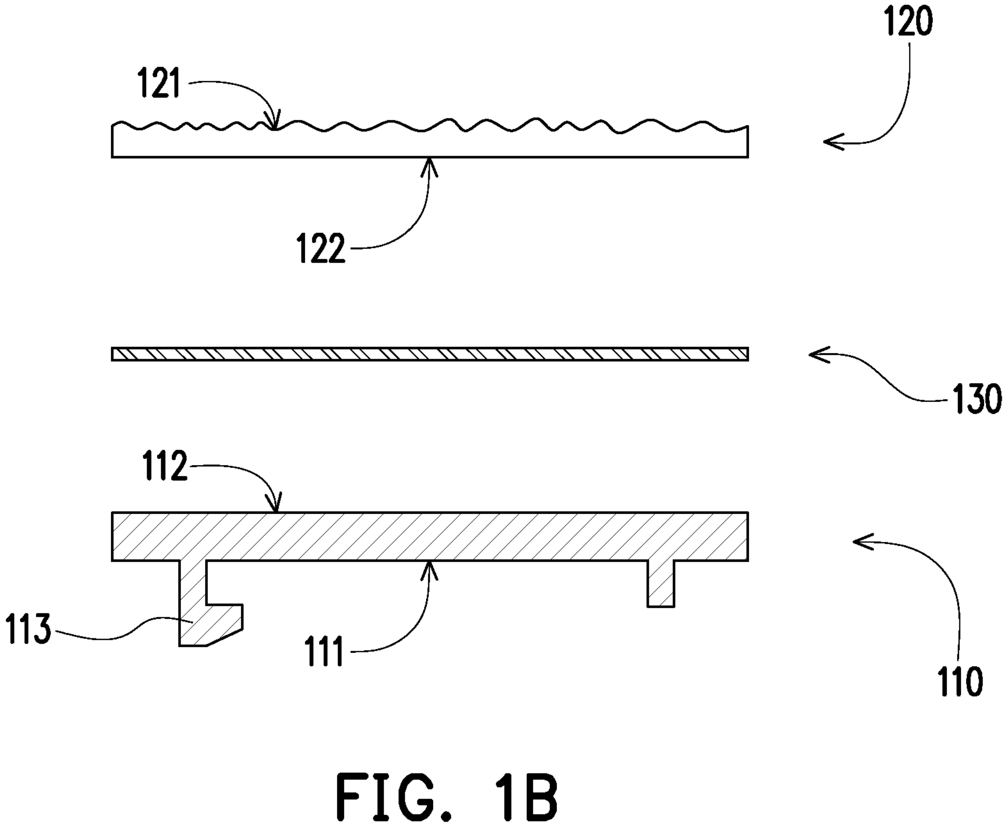
FIG. 1B is a disassembled schematic diagram of the partial housing structure shown in FIG. 1A.

FIG. 1A is a partial schematic diagram of a housing structure according to an embodiment of the present application. FIG. 1B is a disassembled schematic diagram of the partial housing structure shown in FIG. 1A. Referring to FIG. 1A and FIG. 1B, in the embodiment, the housing structure 100 of the electronic device (the following content uses housing structure 100 as a narrative example) is, such as the housing structure of the laptop. The housing structure 100 includes a first structural layer 110, a painting layer 130, and a second structural layer 120. Wherein the first structural layer 110 is, such as the internal components of the housing structure of the electronic device, that is, the main structural member of the housing structure 100. Its surface 111 is provided with a buckle structure 113 to be combined with another housing structure of the opponent. The painting layer 130 is, such as a pigment or ink, and is arranged on the first structural layer 110. The second structural layer 120 is, such as a transparent component of the appearance of the housing structure of the electronic device, and its material is, for example, a light-transmitting engineering plastic (such as PC, PMMA, etc.) or a transparent soft glue (such as TPE or TPEE). The second structure layer 120 is configured and overlaid on the painting layer 130 to protect the painting layer 130 and allow the painting layer 130 to visually produce a jelly-like appearance and a three-dimensional (depth of field) effect through light.

Figure 2A:
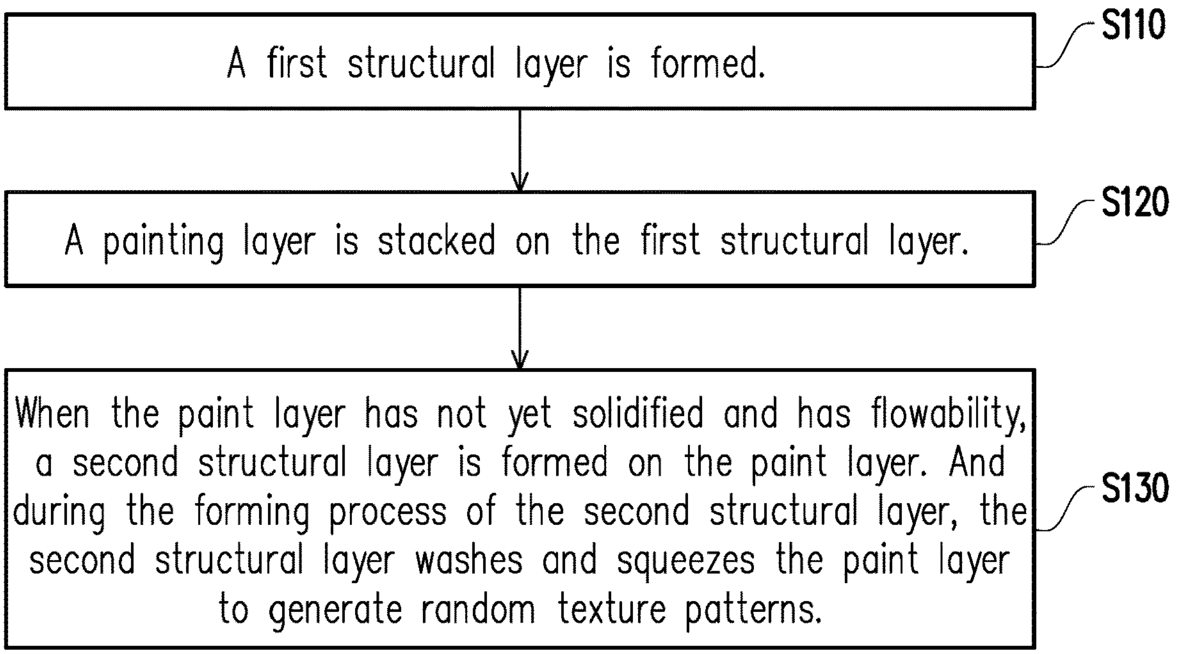
FIG. 2A is a flowchart of a manufacturing method according to an embodiment of the present application.
Figure 2B:
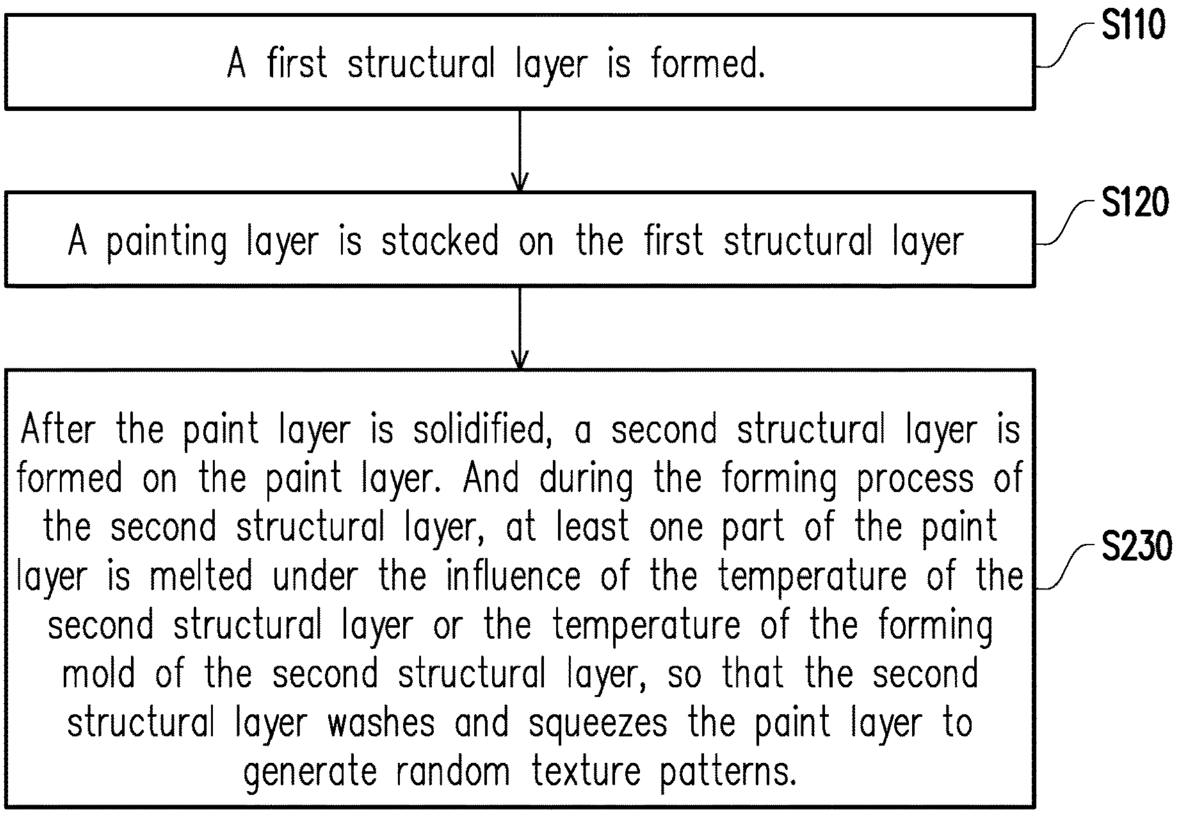
FIG. 2B is a flowchart of a manufacturing method according to another embodiment of the present application.
Figure 3A:
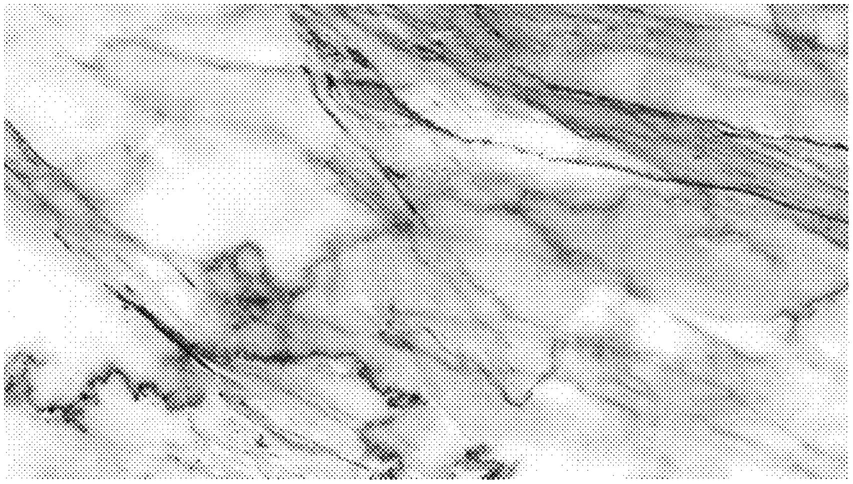
FIGS. 3A and 3B are schematic surface views of a housing structure according to different embodiments of the present application.
Figure 3B:
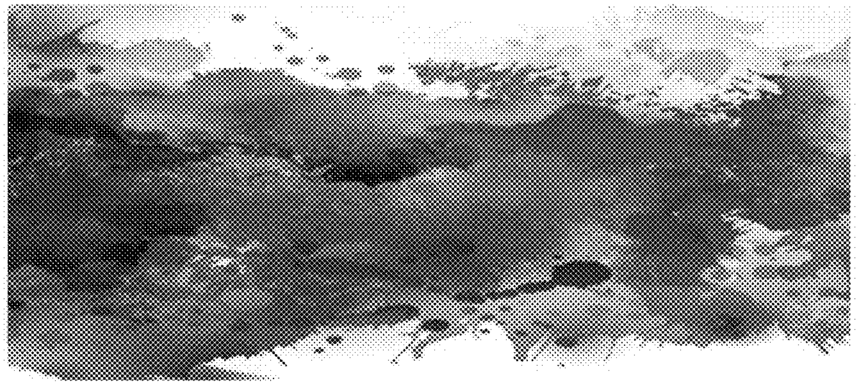

FIG. 2A is a flowchart of a manufacturing method according to an embodiment of the present application, which is used to produce the housing structure shown in FIG. 1A. FIG. 2B is a flowchart of a manufacturing method according to another embodiment of the present application. FIGS. 3A and 3B are schematic surface views of a housing structure according to different embodiments of the present application.

Referring to FIG. 1A, FIG. 1B and FIG. 2A, in the embodiment, first, the first structural layer 110 is provided in step S110. And then, the painting layer 130 is stacked on the top of the first structural layer 110 in step S120. Finally, the second structural layer 120 is stacked on the painting layer 130 in step S130. Further, the first structural layer 110 and the second structural layer 120 in the embodiment are made by plastic injection molding process. In the embodiment, after completing the forming operation of the first structural layer 110, in step S120, a liquid (or colloidal) pigment or ink (painting layer 130) is stacked on the surface 112 of the first structural layer 110 by processes such as coating, spraying, etc. Then, in step S130, when the painting layer 130 is not solidified and has flowability, the second structural layer 120 is continuously formed on the painting layer 130. Therefore, during the molding process of the second structural layer 120, the liquid (or colloidal) second structural layer 120 may wash and squeeze the same flowable painting layer 130 to form random texture patterns. As shown in FIG. 3A or FIG. 3B, but not limited thereto.

Referring FIG. 2B, which shown a manufacturing method that can also produce the housing structure of FIG. 1A, and the difference from the previous embodiment is that, in step S230, after the painting layer 130 is solidified, the second structural layer 120 is formed on the painting layer 130. Wherein the temperature of the second structural layer 120 in the molding process (or the heat generated by it), such as the temperature of the second structural layer 120 itself, or the temperature of the mold for forming the second structural layer 120, may cause the painting layer 130 to be affected and melted (that is to say, the melting point of the painting layer 130 is less than the molding temperature of the second structural layer 120 or the temperature of the molding die). Therefore, the painting layer 130 is made flowable again, and can be washed and squeezed by the second structural layer 120, and can also generate random texture patterns such as those shown in FIG. 3A or FIG. 3B.

Furthermore, referring to FIG. 1A, in the embodiment, the second structural layer 120 is light-transmitting or transparent, and the surface 121 of the second structural layer 120 is wavy or rough. Accordingly, it provides the function of light refraction or scattering, and enhances the depth of field effect produced by random texture patterns.

It should be mentioned in addition that, the first structural layer 110 and the second structural layer 120 of the embodiment are made by the secondary injection molding process, which is equivalent to the secondary injection molding of the first structural layer 110 and the second structural layer 120 with the same mold. And step S120 is performed during the transition of the mold cavity.

Figure 4:
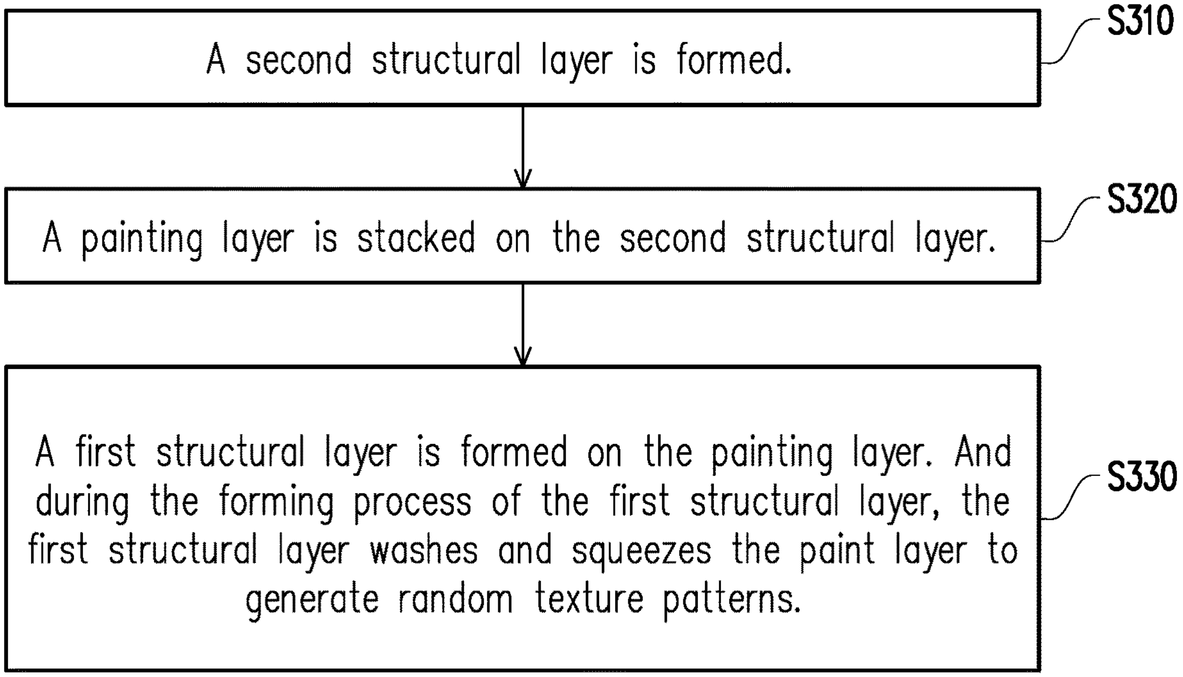
FIG. 4 is a flowchart of a manufacturing method according to another embodiment of the present application.

FIG. 4 is a flowchart of a manufacturing method according to another embodiment of the present application. Referring to FIG. 1A, FIG. 1B and FIG. 4, can be compared with FIG. 2A or FIG. 2B at the same time, the application does not limit the order of stacking the first structural layer 110, the painting layer 130 and the second structural layer 120. Therefore, in the embodiment, the second structural layer 120 is molded in step S310. And then, the painting layer 130 is stacked on the surface 122 of the second structural layer 120 in step S320. Finally, the first structural layer 110 is molded on the painting layer 130 in step S330. Since the first structural layer 110 is also made by the injection molding process, the painting layer 130 can also be washed and squeezed to produce random texture patterns.

It should be noted that, when the first structural layer 110 is molded in the embodiment, it can adopt the mode of forming the first structural layer 110 before the painting layer 130 is solidified as shown in FIG. 2A. The temperature of the first structural layer 110 or the temperature of the forming mold as shown in FIG. 2B can also be used to melt the painting layer 130, which will not be repeated here.

Figure 5:
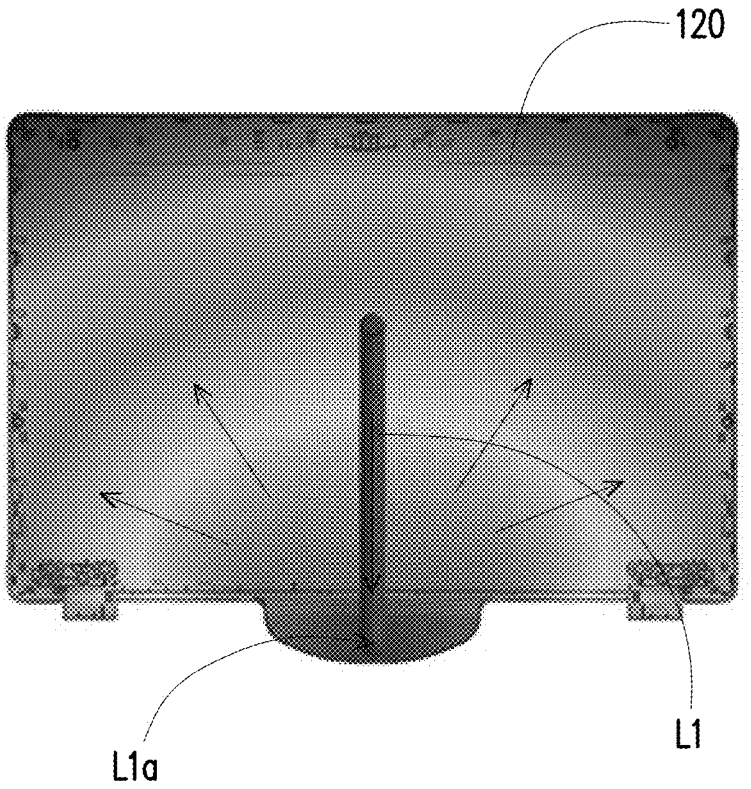
FIG. 5 is a schematic diagram of glue injection according to an embodiment of the present application.

FIG. 5 is a schematic diagram of glue injection according to an embodiment of the present application, which is used to further describe the injection molding process of the second structural layer 120 in the housing structure 100 shown in FIG. 1A. Referring to FIG. 5, in the embodiment, since the second structural layer 120 is a transparent component of the housing structure 100, in order to keep the second structural layer 120 flat, the second structural layer 120 is injection-molded on the painting layer 130 by means of lateral glue feeding. As shown in FIG. 4, the flow channel L1, the glue injection port L1*a* and the glue feeding direction (as shown by the arrows). It can be seen from this that the glue is injected from the lateral edge and radiated in a fan-shaped (or semi-circular) type, and the painting layer 130 has not been completely solidified and has flowability as mentioned above. Accordingly, it is also washed and squeezed by the radiated glue to form a fan-like (or semi-circle-like) radiated random texture pattern.

Figure 6:
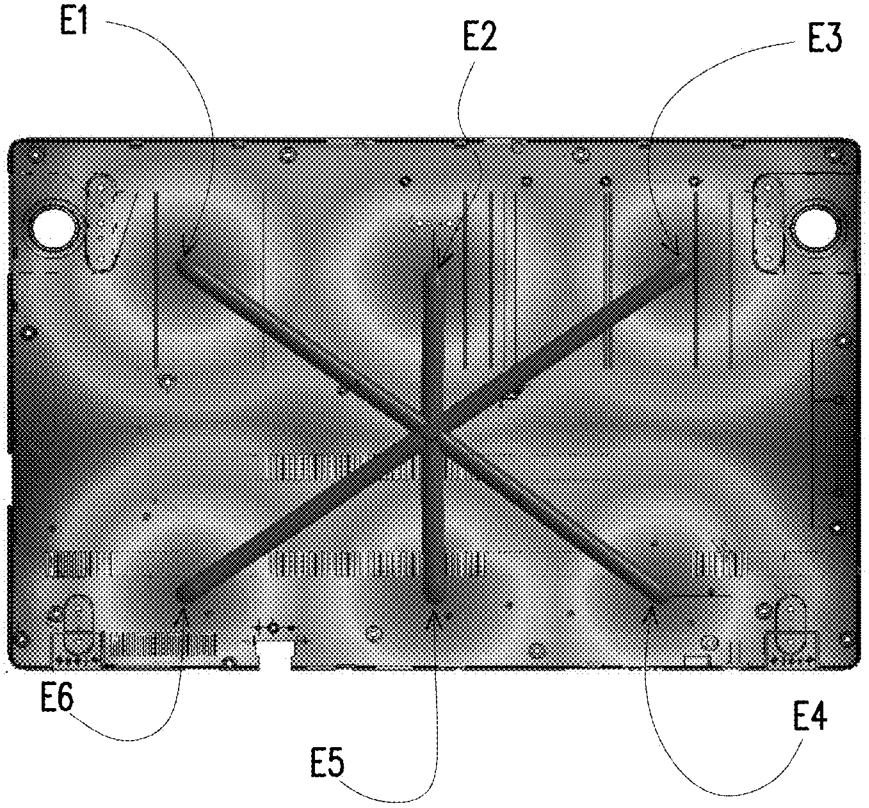
FIG. 6 is a schematic diagram of glue injection according to another embodiment of the present application.

FIG. 6 is a schematic diagram of glue injection according to another embodiment of the present application, which is used to further describe the injection molding process of the first structural layer 110 in the housing structure 100 shown in FIG. 1A. Referring to FIG. 6, in the embodiment, the first structural layer 110, as the main component of the housing structure 100, is more obvious than the second structural layer 120 in structural thickness and structural complexity. Therefore, in order to form the first structural layer 110 smoothly, during the molding process, it will be injection-molded on the painting layer 130 by means of front-side multi-point (multiple glue injection ports E1, E2, E3, E4, E5 and E6 as shown) feeding. Accordingly, the random texture pattern generated by the painting layer 130 which is directly affected by the first structural layer 110 may also generate a corresponding diffusion pattern as shown in FIG. 6 due to the above-mentioned multi-point glue feeding method.

Figure 7A:
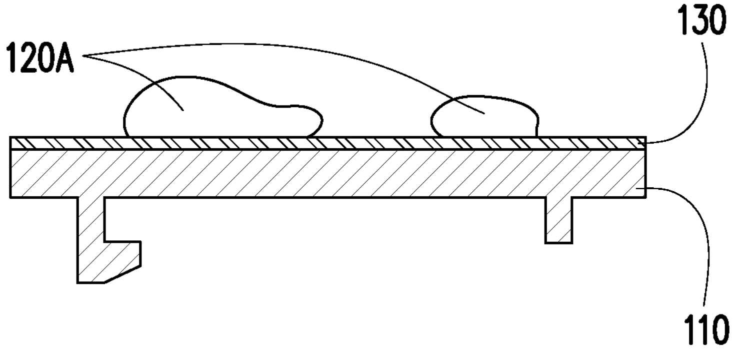
FIG. 7A to 7C illustrate a manufacturing method according to another embodiment of the present application.
Figure 7B:
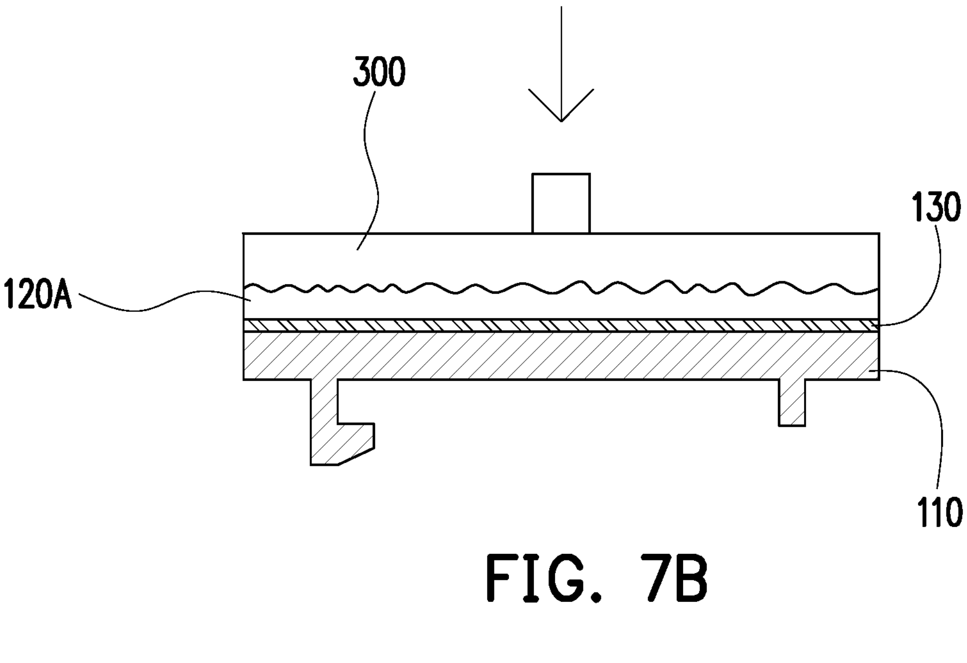
Figure 7C:
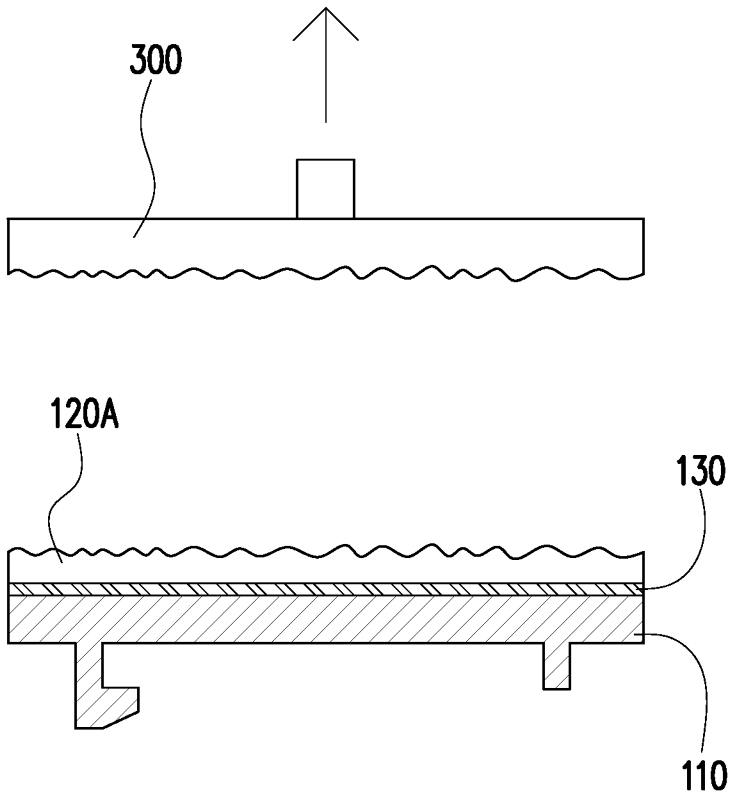

FIG. 7A to 7C illustrate a manufacturing method according to another embodiment of the present application. Referring to FIG. 7A to 7C, in the embodiment, the first structural layer 110 and the painting layer 130 are the same as in the previous embodiment, and the structural features and manufacturing methods will not be repeated. The difference is that the second structural member 120A of the embodiment is dripped or sprayed on the painting layer 130 in a molten state (or liquid state), as shown in FIG. 7A. Next, in FIG. 7B, an indenter 300 is provided to pressurize and drive the second structural layer 120A. In addition to allowing the second structural layer 120A to be evenly covered on the painting layer 130 after being pressed, the second structural layer 120A that is driven can also drive the painting layer 130 to generate random texture patterns. Same as the previous embodiment, the embodiment can also adopt the method shown in FIG. 2A, or adopt the method shown in FIG. 2B, so that the painting layer 130 can maintain the required flowability, which is beneficial for being washed and squeezed by the second structural layer 120A. In addition, the embodiment can also make the indenter 300 cause the surface of the second structural layer 120A to be wavy or rough, for example, the desired pattern is first processed on the surface of the indenter 300. And when it drives the second structural layer 120A, the pattern can be transferred to the outer surface of the second structural layer 120A facing away from the painting layer 130.

In summary, in the manufacturing process of the housing structure, the three-layer structure of the first structural layer, the painting layer and the second structural layer is stacked, wherein the painting layer is located between the first structural layer and the second structural layer. And the layer stacked after the painting layer is stacked in a state where the painting layer is flowable. Therefore, it may further wash and squeeze the flowing painting layer during the stacking process, so that the painting layer may generate random texture patterns. In this way, the housing structure can be reprocessed to its appearance pattern in a simple manner and with simplified steps. Moreover, the reprocessing is completed together with the stacking process of the structural layer, so the manufacturing process of the housing structure does not require additional steps, which can effectively save processing time, processing cost and simplify the processing technology.

Since the stacking sequence of the above three-layer structure is not limited, and the first structural layer and the second structural layer are made by injection molding process, no matter what stacking sequence is used, the first structural layer or the second structural layer can wash and squeeze the flowable painting layer. Furthermore, the flowability of the painting layer can be achieved by the fact that it is not completely solidified after being stacked, or the solidified painting layer can be melted again due to the influence of the temperature of the structural layer stacked on the latter or the forming mold.

In the molding process of first structural layer or second structural layer, the positional arrangement of glue injection port can also further influence the random texture pattern that produces. For the second structural layer, which is a transparent component, under the premise of considering its overall flatness, the second structural layer is injection-molded on the painting layer by means of lateral glue feeding. For the first structural layer, which is an internal component, under the premise of considering its structural strength, the first structural layer is injection-molded on the painting layer by means of front-side multi-point glue feeding.

Accordingly, the manufacturing method of the housing structure of the electronic device can utilize the same flowability (first or second) structural layer and the painting layer to generate random texture patterns, so as to effectively simplify the manufacturing process, manufacturing time and manufacturing cost.

What is claimed is:

1. A manufacturing method of housing structure of electronic device, comprising:

stacking a first structural layer, a painting layer, and a second structural layer, wherein the painting layer is located between the first and the second structural layers, wherein the painting layer is in a molten state while being disposed on the first structural layer, and the second structural layer washes and squeezes the painting layer when the painting layer is not completely solidified to form a random texture pattern, wherein the first structural layer and the second structural layer are formed by secondary injection molding with a same mold, wherein the first structural layer is an internal member of the housing structure of the electronic device, and the second structural layer is an externally transparent member of the housing structure of the electronic device.

2. The manufacturing method of housing structure of electronic device according to claim 1, wherein an outer surface of the second structural layer facing away from the painting layer is wavy or rough.

3. The manufacturing method of housing structure of electronic device according to claim 1, wherein the second structural layer is injection-molded on the painting layer by means of lateral glue feeding.

4. The manufacturing method of housing structure of electronic device according to claim 1, wherein the second structural layer is injection-molded on the painting layer by means of front-side multi-point glue feeding.

5. The manufacturing method of housing structure of electronic device according to claim 1, wherein the second structural layer is flowable and can be sprayed on the painting layer by dripping or spot spraying.

6. The manufacturing method of housing structure of electronic device according to claim 5, further comprises: pressurizing and driving the second structural layer with an indenter.

7. The manufacturing method of housing structure of electronic device according to claim 6, wherein the indenter forms a wavy or rough surface on an outer surface of the second structural layer facing away from the painting layer.

* * * * *